(12) United States Patent
Stutz

(10) Patent No.: US 10,284,598 B2
(45) Date of Patent: May 7, 2019

(54) HONEYPOT NETWORK SERVICES

(71) Applicant: Sophos Limited, Abingdon (GB)

(72) Inventor: Daniel Stutz, Karlsruhe (DE)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 15/010,783

(22) Filed: Jan. 29, 2016

(65) Prior Publication Data

US 2017/0223052 A1 Aug. 3, 2017

(51) Int. Cl.
*H04L 9/00* (2006.01)
*H04L 29/06* (2006.01)

(52) U.S. Cl.
CPC ...... *H04L 63/1491* (2013.01); *H04L 63/1416* (2013.01); *H04L 63/1433* (2013.01)

(58) Field of Classification Search
CPC .................................................. H04L 63/1491
USPC .......................................................... 726/23
See application file for complete search history.

(56) References Cited

U.S. PATENT DOCUMENTS

| | | | |
|---|---|---|---|
| 7,412,723 B2 | 8/2008 | Blake et al. | |
| 8,056,136 B1 * | 11/2011 | Zaitsev ................ | G06F 21/56 726/24 |
| 8,752,174 B2 | 6/2014 | Buford et al. | |
| 8,781,093 B1 | 7/2014 | Rybak et al. | |
| 9,094,325 B2 | 7/2015 | Rybak et al. | |
| 9,912,684 B1 * | 3/2018 | Aziz ...................... | G06F 21/554 |
| 2002/0138755 A1 | 9/2002 | Ko et al. | |
| 2004/0103314 A1 | 5/2004 | Liston | |
| 2006/0101515 A1 * | 5/2006 | Amoroso ........... | H04L 29/12009 726/23 |
| 2008/0163354 A1 * | 7/2008 | Ben-Shalom ....... | H04L 63/1441 726/12 |
| 2009/0328213 A1 | 12/2009 | Blake et al. | |
| 2009/0328216 A1 | 12/2009 | Rafalovich et al. | |
| 2014/0096229 A1 | 4/2014 | Burns et al. | |
| 2015/0334231 A1 | 11/2015 | Rybak et al. | |

(Continued)

FOREIGN PATENT DOCUMENTS

| | | |
|---|---|---|
| EP | 2953049 | 12/2015 |
| WO | WO-2006131124 | 12/2006 |

OTHER PUBLICATIONS

IPO, "UK Application No. 1700556.2 Search Report dated Jun. 6, 2017", 4 pages.

*Primary Examiner* — Christopher J Brown
(74) *Attorney, Agent, or Firm* — Strategic Patents, P.C.

(57) ABSTRACT

In general, in one aspect, a system for providing honeypot network services may monitor network activity, and detect network activity indicative of network service discovery by a first device, for example, port scanning. The system may present a temporarily available network service to the first device in response to detecting the activity indicative of port scanning, for example, by redirecting traffic at an unassigned network address to a honeypot network service. The system may monitor communication between the first device and the presented honeypot network service to determine whether the monitored communication is indicative of a threat, and determine that the first device is compromised based on the monitored communication between the first device and the presented honeypot network service. The system may initiate measures to protect the network from the compromised first device.

14 Claims, 7 Drawing Sheets

(56) References Cited

U.S. PATENT DOCUMENTS

2015/0381636 A1 12/2015 Luckett, Jr. et al.
2016/0294870 A1* 10/2016 Banerjee ............... H04L 43/067

* cited by examiner

| row | address | system | ports offering services |
|---|---|---|---|
| 501 | 10.1.1.1 | server 401 | 23, 48, 80, 8080 |
| 502 | 10.1.1.2 | server 402 | 23, 48, 80, 8080 |
| 503 | 10.1.1.3 | server 403 | 23, 48, 80, 8080 |
| ... | | | |
| 509 | 10.1.1.9 | web server 409 | 80, 8080 |
| 510 | 10.1.1.10 | unassigned | |
| ... | | | |
| 519 | 10.1.1.19 | unassigned | |
| 520 | 10.1.1.20 | user device 410 | |
| 521 | 10.1.1.21 | user device 411 | |
| 522 | 10.1.1.22 | user device 412 | |
| 523 | 10.1.1.23 | unassigned | |
| ... | | | |
| 530 | 10.1.1.30 | unassigned | |
| 531 | 10.1.1.31 | printer 421 | |
| 532 | 10.1.1.32 | printer 422 | |
| 533 | 10.1.1.33 | printer 423 | |
| 534 | 10.1.1.34 | unassigned | |

FIG. 5

| log entry | from address | from port | to address | to port | notes |
|---|---|---|---|---|---|
| ... | | | | | |
| 601 | 10.1.1.20 | 10300 | 10.1.1.2 | 80 | HTTP request from user device 410 to server 402 |
| 602 | 10.1.1.21 | 13200 | 10.1.1.3 | 80 | HTTP request from user device 411 to server 403 |
| 603 | 10.1.1.20 | 10301 | 10.1.1.2 | 80 | HTTP request from user device 410 to server 402 |
| 604 | 10.1.1.21 | 13201 | 10.1.1.23 | 23 | request from user device 411 to unassigned address |
| 605 | 10.1.1.21 | 13201 | 10.1.1.23 | 28 | second request from user device 411 to unassigned address |
| | | | | | [honey pot presented at 10.1.1.23 to 10.1.1.21] |
| 606 | 10.1.1.20 | 10300 | 10.1.1.2 | 80 | HTTP request from user device 410 to server 402 |
| 607 | 10.1.1.21 | 13201 | 10.1.1.23 | 80 | user device 411 makes HTTP request to honeypot port 80 |
| 608 | 10.1.1.21 | 13201 | 10.1.1.23 | 80 | user device 411 makes another HTTP request to honeypot port 80 |
| | | | | | [compromise determined based on second request] |
| | | | | | [protection initiated] |

FIG. 6

HONEYPOT NETWORK SERVICES

TECHNICAL FIELD

This application relates to computer network security and to detecting computer network intrusion.

BACKGROUND

In order to intrude into a system or to start an attack (e.g., a denial of service attack), attackers attempt to determine information about network services available on a network in order to take advantage of security deficiencies of these network services. For example, network services using the TCP and UDP Internet protocols can be accessed via specific ports and the port assignment is generally known, for example the SMTP service generally is assigned to the TCP Port 25. Ports that provide network services on a network device may be referred to as "open," since it is possible to establish a connection to the network service, whereas unused ports are referred to as "closed," since attempts to connect with them will fail.

An attacker with access to a network may attempt to find open ports with the help of a particular software tool, referred to as a port scanner. A port scanner program tries to connect with several ports on the destination computer. If it is successful, the tool displays the relevant ports as open and the attacker obtains potentially useful information, showing which network services are available on the destination computer. There are currently 65535 distinct and usable port numbers for the TCP and UDP Internet protocols, and so the ports are typically scanned at very short intervals.

A conventional network monitor may detect an unusually large number of attempts to connect to services from the same source address as a port scan. When a port scan is detected, an action may be taken such as logging the scan, dropping packets from the port scanning device, or rejecting packets from the port scanning device. Thus, further port scan activity from the same source address may be blocked. In each case, there is the possibility of false positives, which would create problems for applications and users who have a legitimate need to conduct network activity that triggers conventional port scan detection.

SUMMARY

In some implementations, a network device may be suspected of compromise based on detected network activity of the network device, alone or in combination with other devices. The network activity may include, for example, access of network addresses or ports known to be unassigned network addresses or unused ports. When a network device is suspected of compromise, honeypot network services may be made available temporarily (e.g., for a limited time) to the suspected device and in some cases only to the suspected network device and any other suspected network devices. Communication between the suspected network device and the honeypot network services are monitored, and based on the monitored communication the suspected network device may be convicted as compromised. Steps may be initiated to protect the network from the compromised device, including isolating the compromised device or the compromised application, and remediating the compromise.

For example, a honeypot network service may be made available to suspected devices at a previously unassigned network address. The same honeypot network service may be made available at a number of previously unassigned network addresses.

In some implementations, a trigger for suspecting a device of compromise may be more sensitive than conventional port scanning detection, because the network device is first suspected based on network service discovery network activity, and then convicted based on interaction with a honeypot network service. At the same time, presenting honeypot network service(s) only to suspected network device(s) minimizes disturbance to users of the network.

In general, in one aspect, a system for detecting a compromised device includes a processor and a memory comprising instructions executable by the processor, the instructions when executed causing the processor to detect network activity indicative of network service discovery by a first device.

In some implementations, detecting network service discovery may be performed by detecting a number of network requests to different ports in a period of time. In some implementations, detecting network service discovery may be performed by detecting a number of network requests to a specific port at two or more different network addresses. In some implementations, detecting network service discovery may be performed by detecting a first network request to a first port associated with an unassigned network address and a second network request to a second port at the unassigned network address. In some implementations, detecting network service discovery may be performed by detecting a plurality of network requests to unassigned network addresses or ports.

In response to detecting the activity indicative of network service discovery, the system may present a target network service to the first device.

In some implementations, the target network service is a honeypot network service. The target network service may be presented by configuring a network device to respond to requests at a particular network address. The network address may have been previously unassigned. The target network service may be presented by redirecting traffic at an unassigned network address to a honeypot network service. In some implementations, the target network service may be presented simultaneously at two or more network addresses. In some implementations, the target network service may be presented only to devices that are suspected of compromise based on detected activity indicative of network service discovery.

The system may monitor communication between the first device and the presented network service. The system may determine that the first device is compromised based on the monitored communication between the first device and the presented network service. The system may determine that the first device is compromised based on interaction between the first device and the presented network service.

Having determined that the first device is compromised, the system may protect the network from the compromised first device. The system may protect the network by preventing communication from the first device to the network. The system may protect the network by notifying a threat detection facility that the first device is compromised. The system may protect the network by identifying a process on the first device that generated the detected network activity. The system may protect the network by pausing or terminating the process or application on the first device that generated the detected network activity. The system may protect the network by isolating the process or application on the first device that generated the detected network activity.

In general, in one aspect, a non-transitory computer-readable medium includes instructions executable by a processor for detecting a compromised device on a network, the instructions when executed cause the processor to monitor network activity and detect network activity indicative of network service discovery by a first device. The instructions when executed may cause the processor to present a temporarily available network service to the first device in response to detecting the activity indicative of port scanning. The instructions when executed may further cause the processor to monitor communication between the first device and the presented honeypot network service to determine whether the monitored communication is indicative of a threat. The instructions when executed may further cause the processor to determine that the first device is compromised based on the monitored communication between the first device and the presented honeypot network service. The instructions when executed may further cause the processor to initiate measures to protect the network from the compromised first device.

In some implementations, detecting network service discovery may be performed by detecting a number of network requests to different ports in a period of time. In some implementations, detecting network service discovery may be performed by detecting a number of network requests to a specific port at two or more different network addresses. In some implementations, detecting network service discovery may be performed by detecting a first network request to a first port associated with an unassigned network address and a second network request to a second port at the unassigned network address. In some implementations, detecting network service discovery may be performed by detecting a plurality of network requests to unassigned network addresses or ports.

In some implementations, the honeypot network service may be presented by configuring a network device to respond to requests at a particular network address. The network address may have been previously unassigned. The honeypot network service may be presented by redirecting traffic at an unassigned network address to a honeypot network service. In some implementations, the honeypot network service may be presented simultaneously at two or more network addresses. In some implementations, the honeypot network service may be presented only to devices that are suspected of compromise based on detected activity indicative of network service discovery. The honeypot network service may be presented for a predetermined period of time.

In some implementations, the measures to protect the network may include preventing communication from the first device to the network. The measures to protect the network may include isolating the first device from communication with the network. In some implementations, the measures to protect the network may include notifying a threat detection facility that the first device is compromised. In some implementations, the measures to protect the network may include generating an alert about the compromised first device. The measures to protect the network may include identifying a process on the first device that generated the detected network activity. The measures to protect the network may include pausing or terminating the process or application on the first device that generated the detected network activity. The measures to protect the network may include isolating the process or application on the first device that generated the detected network activity.

In general, in some aspects, a method for detecting a compromised device on a network may include detecting network activity indicative of network service discovery by a first device. The method may include presenting a network service to the first device in response to detecting the activity indicative of network service discovery. The method may include monitoring communication between the first device and the presented network service. The method may include determining that the first device is compromised based on the monitored communication between the first device and the presented network service. The method may include protecting the network from the compromised first device.

In some implementations, detecting network service discovery may be performed by detecting a number of network requests to different ports in a period of time. In some implementations, detecting network service discovery may be performed by detecting a number of network requests to a specific port at two or more different network addresses. In some implementations, detecting network service discovery may be performed by detecting a first network request to a first port associated with an unassigned network address and a second network request to a second port at the unassigned network address. In some implementations, detecting network service discovery may be performed by detecting a plurality of network requests to unassigned network addresses or ports.

In some implementations, the presented network service is not accessible by the first device prior to the presenting. In some implementations, the presented network service is accessible only by the first device. In some implementations, the presented network service is a honeypot network service. In some implementations, the presented network service may be presented by configuring a network device to respond to requests at a particular network address. The network address may have been previously unassigned. The presented network service may be presented by redirecting traffic at an unassigned network address to the presented network service. In some implementations, the presented network service may be presented simultaneously at two or more network addresses. In some implementations, the presented network service may be presented only to devices that are suspected of compromise based on detected activity indicative of network service discovery. In some implementations, the presented network service is accessible to the first device and its local network. The presented network service may be presented for a predetermined period of time.

In some implementations, the measures to protect the network may include preventing communication from the first device to the network. The measures to protect the network may include isolating the first device from communication with the network. In some implementations, the measures to protect the network may include notifying a threat detection facility that the first device is compromised. In some implementations, the measures to protect the network may include generating an alert about the compromised first device. The measures to protect the network may include identifying a process on the first device that generated the detected network activity. The measures to protect the network may include pausing or terminating the process or application on the first device that generated the detected network activity. The measures to protect the network may include isolating the process or application on the first device that generated the detected network activity.

In some implementations, the network service is presented by making the network service available at a previously unassigned network address. In some implementations, the network service is presented by forwarding traffic directed to an unassigned network address to a network device. In some implementations, the activity indicative of network service discovery comprises port scanning. In some implementations, detecting network activity indicative of network service discovery comprises detecting a request to a network service at an unassigned network address. In some implementations, detecting network activity indicative of network service discovery comprises detecting a plurality of requests to a network service at different ports associated with an unassigned network address. In some implementations, the request to the network service is made to a predetermined port of an unassigned network address. In some implementations, the method also includes detecting a second network request to a second port at a different unassigned network address.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 5 illustrates a list of network addresses for the exemplary network of FIG. 4.

FIG. 6 illustrates a demonstrative example of network requests in an implementation.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
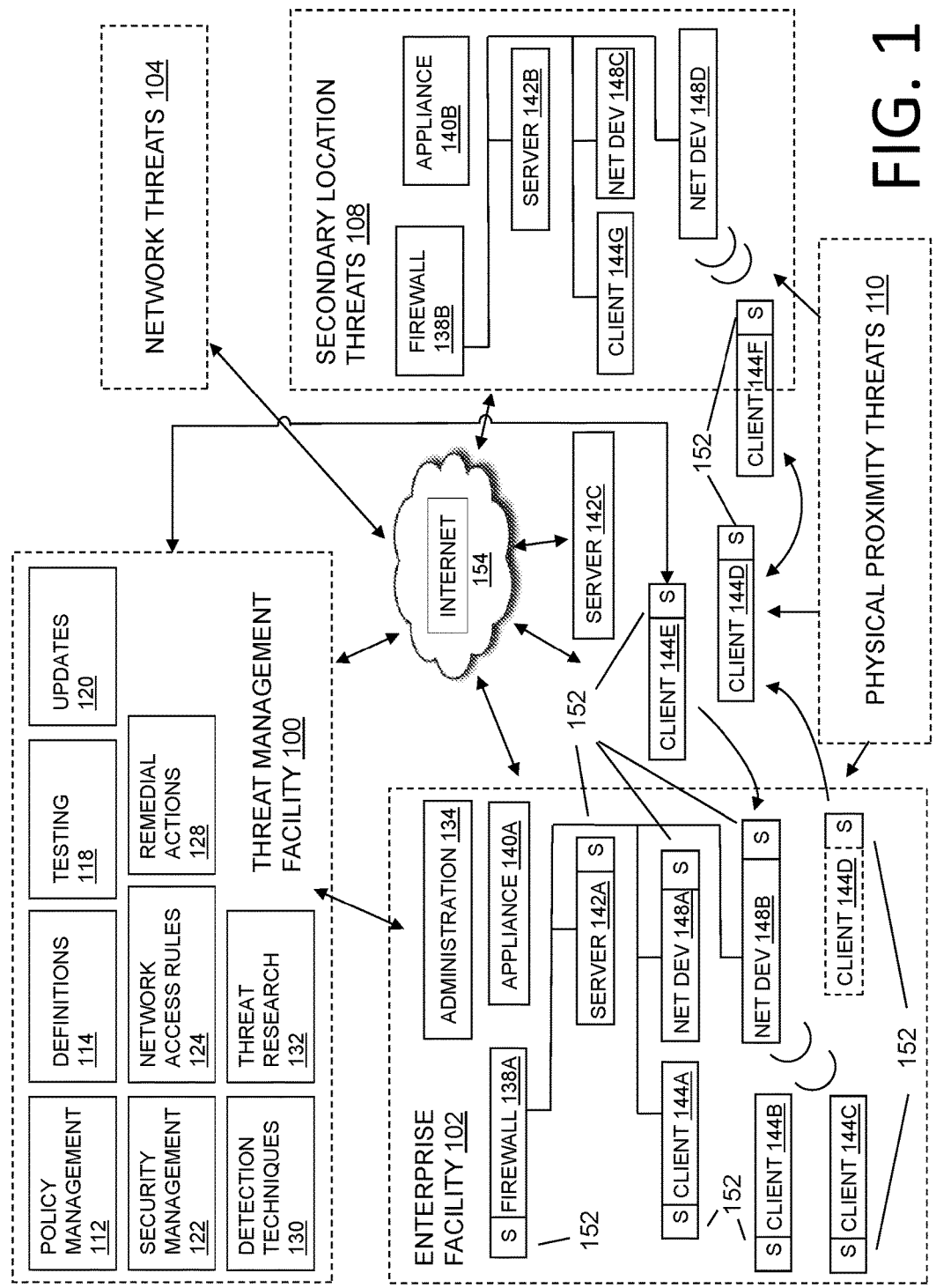
FIG. 1 illustrates an environment for threat management according to some implementations.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a PDA or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network.

Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In some embodiments, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Figure 2:
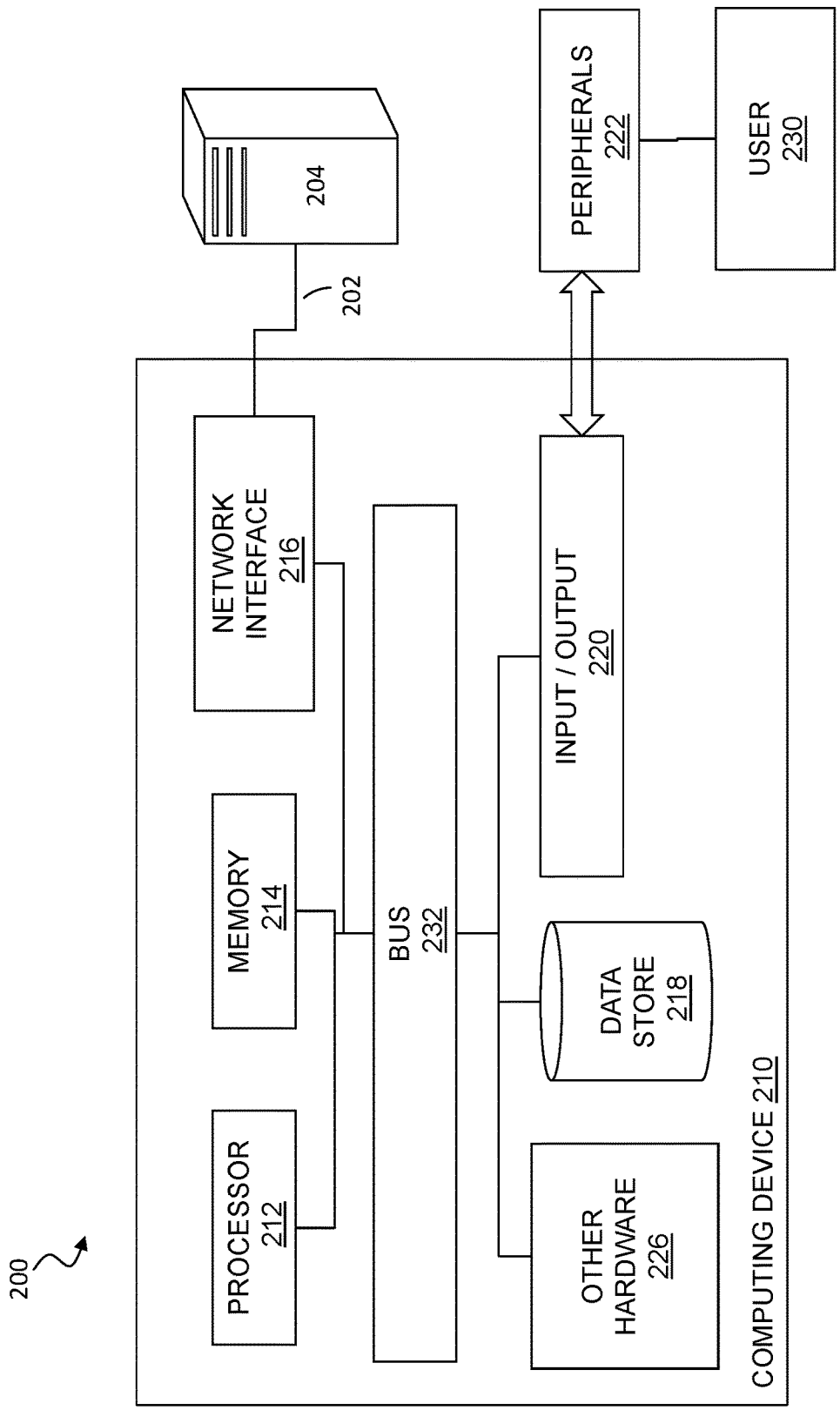
FIG. 2 illustrates a network system according to some implementations.

FIG. 2 illustrates a networking system 200. In general, the networking system 200 may include a network device 210 connected to a network 202, e.g., to an external device 204. The network device 210 may be or include any type of network endpoint or endpoints as described herein, e.g., with reference to FIG. 1 above. For example, the network device 210 may include a desktop computer workstation. The network device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The network device 210 may also or instead include a server, or it may be disposed on a server.

The network device 210 may be used for any of the entities described in the threat management environment described above with reference to FIG. 1. For example, the network device 210 may be a server, a client an enterprise facility, a threat management facility, or any of the other facilities or computing devices described therein. In certain aspects, the network device 210 may be implemented using hardware or a combination of software and hardware, and the network device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the network device 210 through the network 202. This may include threat management resources such as any of those contemplated above, gateways or other network devices, remote servers or the like containing content requested by the network device 210, a network storage device or resource, a device hosting malicious content, or any other resource or device that might connect to the network device 210 through the network 202.

The network device 210 may include a processor 212, a memory 214, a network interface 216, a data store 218, and one or more input/output devices 220. The network device 210 may further include or be in communication with peripherals 222 and other external input/output devices 224.

The processor 212 may be any as described herein, and in general be capable of processing instructions for execution within the network device 210 or computer system 200. The processor 212 may include a single-threaded processor or a multi-threaded processor. The processor 212 may be capable of processing instructions stored in the memory 214 or on the data store 218.

The memory 214 may store information within the network device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the network device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein.

The network interface 216 may include any hardware and/or software for connecting the network device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the network device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the network device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the network device 210. The data store 218 may store computer readable instructions, data structures, program modules, and other data for the network device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the network device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the network device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the network device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the network device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Having provided an overall context for threat detection, the description now turns to devices, systems, and methods for providing honeypot network services. Honeypot network services may be used as part of, in addition to, in conjunction with, or to supplement the threat detection described above. In another aspect, the devices, systems, and methods for providing honeypot network services are separate from a threat detection system such as those described above.

Figure 3:
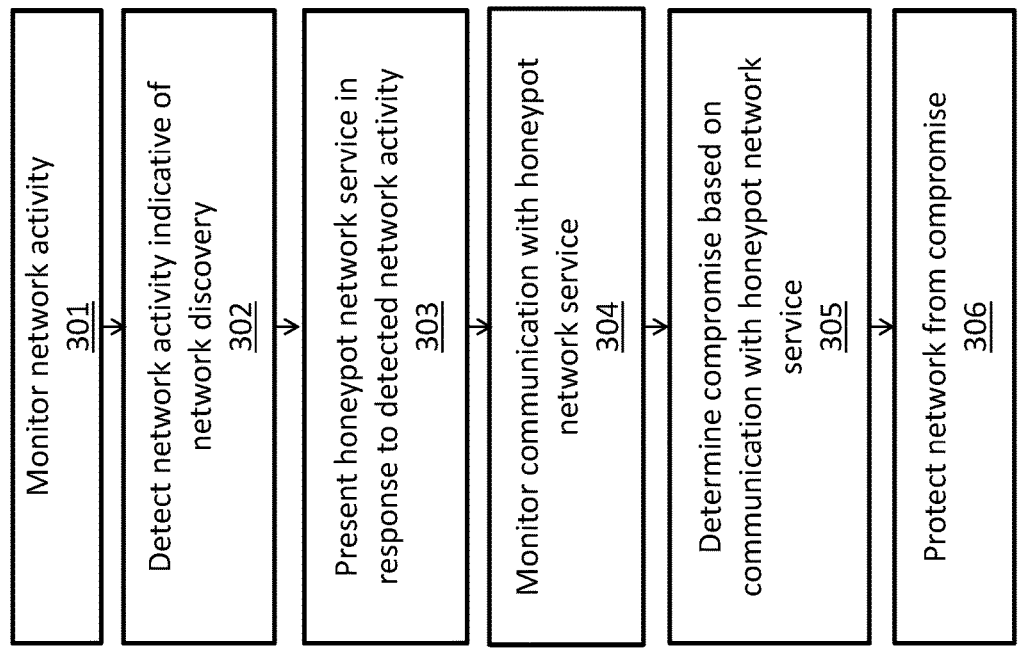
FIG. 3 illustrates a method for detecting a compromised device on a network according to some implementations.

Referring to FIG. 3, in some implementations, a method 300 for detecting a compromised device in a network may include, in block 301, monitoring network activity. Monitoring network activity may be performed, for example, by a network monitor. The network monitor may be implemented, for example, on a network server or network management device, which may include or may be part of one or more of a threat management facility 100, firewall 138A, appliance 140A, server 142A, network device 148A, 148B, and/or another device. The network monitor may be part of or included in a device that monitors other network activity. The network monitor may have physical access to the network and the capability to monitor traffic on the network. The network monitor may be in communication with one or more devices that have physical access to the network. The network monitor may track or log the activity of each device on the network or a portion of the network. The network monitor may track or log activity of one or more selected devices on the network.

In some implementations, monitoring network activity may include monitoring communication between a first device and other devices on the network or in other networks. For example, all devices on a local network may be monitored. For example, a subset of devices on a local network may be monitored. For example, the network may be monitored by routing all communication through one or more devices, so that the one or more devices have access to all communication on the network. This may be possible, for example, with a switch or router, or a group of switches and routers. The network may be monitored by passively monitoring all communication on one or more local networks with one or more network monitors.

In block 302, the method may include detecting network activity indicative of network service discovery, such as port scanning. Here, network service discovery and port scanning are intended to include any technique in which attempts are made to connect to network devices to determine what network services are available. For example, malware running on a compromised device in the network may automatically search one or more ports on a number of network addresses in a network to determine whether the address/port presents a network service. For example, a request may be made to port 23 at a network address to determine whether a device at that network address presents a telnet service. Another request may be made to port 23 at another network address. As another example, a request may be made to port 42 at that network address to determine whether a device at that network address presents a Windows Internet Name Service. A request may be made to port 23 at the same network address to determine whether the device at that network address presents a telnet service. Once a network service has been discovered, malware or an intruder may attempt to use an exploit to take advantage of a security deficiency in a network service to gain unauthorized access to the system.

Detection of network activity indicative of network service discovery may be accomplished in any suitable manner. In some implementations a network monitor tracks requests made by devices to network addresses and ports. For example, a request made by a network device to two or three different ports at one network address may be indicative of network service discovery. For example, requests made by a network device to the same or a particular port at multiple network addresses may be indicative of network service discovery, particularly if one or more of the network addresses are unassigned. For example, one or more requests made outside of expected addresses and ports may be indicative of network service discovery. In a network where multiple devices are compromised, or in which a compromised system simulates multiple network devices, requests may be, or may appear to be, made by multiple network devices, and so detection of network activity indicative of network service discovery may take this into account.

Some normal device activity may have similar characteristics to network service discovery. For example, some operating systems may attempt to detect printers or file sharing services available on a network, and so may check certain network addresses and ports for print and file services. In some implementations, allowed network service discovery attempts may be detected and exempted from the detection of activity indicative of network service discovery. In this way a typical end user would not trigger suspicion.

Requests made to a port and network address that are not consistent with the current network topology may be indicative of network service discovery. For example, a request made to an unassigned network address (e.g., an address not assigned to any device) may indicative of network service discovery. For example, a request made to a port at a network address that is assigned to a device, but for which the network device does not provide a service at that port may be indicative of network service discovery. In some implementations, detecting network activity indicative of network service discovery comprises detecting a first request made to a first port at a first unassigned network address and a second network request to a second port at a second unassigned network address. The second unassigned network address may be different from the first network address.

In some implementations, detecting network activity indicative of network service discovery comprises detecting a plurality of requests to different ports associated with an unassigned network address. In some implementations, detecting network activity indicative of network service discovery comprises detecting a request to a network service at a predetermined port of an unassigned network address.

In some implementations, a network monitor may monitor requests made by or to one or more devices on the network to determine whether the requests are consistent with the network topology as known by the network monitor. For example, the network monitor may have access to a list or database of network devices and services offered by the network devices. A request made that is inconsistent with the services offered may be indicative of network service discovery. One or more requests made by the same device or to the same device that is inconsistent with the services offered may be indicative of network service discovery. The services may be services that are designated as offered by the devices or services typically offered by devices in a classification to which the device is assigned.

In some implementations, a network monitor may have access to a list or database of each device on the network and a classification for that type of device. The classification may include categories of service (e.g., application server, web server, user device, printer). The classification may include a designation of owner (e.g., end user, administrative user, infrastructure device). The classification may include a designation of department (e.g., sales, information technology, accounting). The classification may be used to determine expected ports for access to the device. Requests to ports outside the expected ports for that device may be indicative of network service discovery. For example, a device classified as a web server may not be expected to make a HTTP request to a printer. Such a request would be outside of the expected request types, and so may be indicative of network service discovery.

In some implementations, a network monitor may track and record requests made to devices on the network over time, so as to determine which requests to which ports and addresses are typically made. Requests made to a port/address that are unique and/or are infrequent for a particular device or classification of device may be indicative of network service discovery. In some implementations, categories of devices are used, so that requests made by user devices are tracked and requests made by servers are tracked over time. Requests made to a port/address that is outside of the pattern for the category of device may be indicative of network service discovery.

In some implementations, a network monitor may be configured to detect access patterns in short (e.g., less than 0.25 seconds, less than 0.5 seconds, less than 1 second, less than 2 seconds) time intervals. Access attempts to low (e.g., privileged) ports are weighted higher than high port access attempts. The network monitor may monitor access to network addresses on the local network or all network traffic to which the network monitor has access by passively monitoring and processing network traffic on the network.

A network monitor may identify one, two, three, or more network requests that may be indicative of network service discovery. For example, if a threshold number of network requests to an unassigned port and/or network address are made, network service discovery may be determined to be detected.

In some implementations, a score is used to determine whether network service discovery is detected. Requests are assigned a score, and if the score meets a threshold, network service discovery is determined to be detected. Requests to or from a server within a particular time period (e.g., 1 second, 10 seconds, 30 seconds, 1 minute, 30 minutes, 1 hour, 12 hours, 1 day, 1 week) may be scored to determine whether the requests meet a threshold.

In some implementations, some network requests may be treated as more suspicious than others, and therefore have a higher weight in the score. For example, requests to frequently-used ports may be less suspicious than requests to infrequently used ports, and therefore have a lower score. For example, requests to unused network addresses may be more suspicious than requests to an unused port of an active device, and therefore have a higher score.

A score may also take into account other considerations, such as a total number of requests, a frequency of requests (e.g., requests within a time period (e.g., 1 second, 10 seconds, 30 seconds, 1 minute, 30 minutes, 1 hour, 12 hours, 1 day, 1 week), etc.

In some implementations, a categorization of a device may be used to determine what threshold for requests, or what type of requests will present a honeypot network service. For example, if an administrative device is known to undertake network service discovery for administrative or security purposes, that device may be exempted from presentation, or have a high threshold score. Likewise, if a device is not expected to have any network requests, or have only a specific type of network request, all requests may be indicative of network service discovery. If a device makes requests outside of historical or an expected request profile based on device category, such requests may be indicative of network service discovery.

In some implementations, a network monitor may be implemented on a system using the Linux operating system and netfilter/iptables. A netfilter extension "psd" attempts to detect port scans. Parameters that can be set for psd include: "psd-weight-threshold," which is the total weight of the latest TCP/UDP packets with different destination ports coming from the same host to be treated as port scan sequence; "psd-delay-threshold delay," which is the delay (in hundredths of second) for packets with different destination ports coming from the same host to be treated as a possible port scan subsequence; "psd-lo-ports-weight," which sets the weight of the packet with a privileged (<=1024) destination port; and "psd-hi-ports-weight," which sets the weight of a packet with non-privileged destination port. In some implementations, parameters used for psd are: psd-weight-threshold: 21, psd-delay-threshold: 300, psd-lo-ports-weight: 3, and psd hi-ports-weight: 1.

In some implementations, network service discovery is detected when a detection score of 21 points in a time range of 300 ms for one individual source IP address is exceeded. The detection score is calculated as follows: request to a TCP destination port less than 1024: 3 points; request to a TCP destination port greater or equal 1024: 1 point; request to ports 11, 12, 13, 2000: 10 points.

In block 303, the method may include presenting a honeypot network service in response to the detected network activity. A honeypot network service may be a simulated, instrumented, monitored, or designated network service that is presented as a target. The honeypot network service may have characteristics that make it an attractive target. For example, a honeypot network service may present a service with known vulnerabilities. For example, a honeypot network service may present a network service with a security flaw (e.g., no password configured or easily guessed password). For example, a honeypot network service may present as a network service that offers content (e.g., files, data) that may be attractive to an attacker (e.g., financial data).

A honeypot network service may be presented along with one or more other honeypot network services, so that there are two or more network services presented on different ports of a network address. A honeypot network service or services may be presented so as to present the appearance of a particular honeypot device. For example, a collection of honeypot network services may be presented so as to give the impression of a particular type of device. For example, a web application server may be expect to present services on ports 22, 80, and 8080, honeypot network services may be presented on ports 22, 80, and 8080. For example, in some implementations, ports presented as honeypot network services may include well-known privileged ports for HTTP/HTTPS (TCP: 80, 8080, 443), SMB (UDP: 137-137, TCP: 445), FTP (TCP: 21), SMTP (TCP: 25, 587, 465), IMAP (TCP: 143, 993) as well as others.

The honeypot network service(s) presented may be selected based on the honeypot network services that are available. For example, in some implementations, a number of honeypot network service are configured in a network device, and all or a subset (including only 1) of the honeypot network services may be presented at a network address. In some implementations, a set of one or more network services may be selected to present, for example to simulate a type of network device (e.g., an application server, a user device, etc.). In some implementations, a suspected network device makes a request to a port on a network address, and the honeypot network service(s) may be selected so as to present a service at that port.

In some implementations, a honeypot network service may be presented at multiple addresses and/or ports on a network. For example, a network monitor may configure the honeypot network service to be presented on more than port and/or address. This may provide more potential targets for a compromised device to pursue. There may be different honeypot network services presented on different ports/address, or the same honeypot network service may be presented to different ports/addresses.

In some implementations, the honeypot network service may be presented by simulating a network service. The network monitor or another device may be configured to respond to requests at a particular port and address. The simulation of the network service may be such that there would appear to be a vulnerability or particular data presented, but the actual service provided may be fictional or limited in scope. The honeypot network service may appear to have access to data, but in fact the data may not be available, or may also be simulated or fictional. The data available to the honeypot network service may be simulated or test data that appears to be attractive.

In some implementations, one or more honeypot network services may be selected to give the appearance of an application server with a particular operating system and network services, and the honeypot network service may be configured to present itself at a particular port and network address to simulate such an application server.

In some implementations, a honeypot network service (whether or not simulated) is configured to present at a first port and/or network address (which may or may not be available to network devices generally or to a suspected network device), and a network device is configured so as to present the honeypot network service instead or in addition at a second port and/or network address. For example, requests made to an otherwise unallocated network port or address may be forwarded to a honeypot network service. This may be accomplished, for example, with Network Address Translation (NAT). In this way, a honeypot network service may be presented at one or more other addresses or ports without requiring changes to the honeypot network service. A network monitor may cause a honeypot network service to be presented by configuring a network switch or router to forward network traffic to/from a desired network address and port to the network device that is providing the honeypot network service.

In some implementations, a honeypot network service may be presented to only one or a limited number of devices on the network. For example, if presenting the honeypot network service is triggered by a request or requests from one potentially compromised device, the honeypot network service may be presented only to that device. This may be accomplished by only forwarding requests from that one suspected device to the honeypot network service. By selectively presenting the honeypot network service only to a suspected device or devices, other network devices remain unaffected. If there are a number of suspected devices, each of them may be directed to the same honeypot network service. Each suspected device may have access to a honeypot network service made available to that device at different address.

In some implementations, the address/port on which the honeypot network service is presented is randomly assigned among a group of unassigned network addresses. In some implementations, the address/port on which the honeypot network service is presented is assigned based on the activity indicative of network discovery. The address/port on which the honeypot network service is presented may be the designated port for the honeypot network service at the address that is apparently being targeted.

For example, a network monitor may detect network activity indicative of network service discovery at a particular network address by a suspected network device, and in response configures a network device to present a honeypot network service at that network address. For example, the network monitor detects port scanning at 10.1.2.144. The network monitor then causes a honeypot network service to be presented on port 8080 at address 10.1.2.144 by configuring routing tables (e.g., network address translation) to forward requests made by the suspected device to 10.1.2.144 to the address of the honeypot network service. The forwarding should be transparent to the network device initiating the network request.

In some implementations the address/port on which the honeypot network service is presented may be the designated port for the honeypot network service at one or more addresses that are near the suspected activity. For example, if the network monitor detects port scanning at 10.1.2.144, and network addresses 10.1.2.143, 10.1.2.145, and 10.1.2.146 are unassigned, the network monitor then causes a honeypot network service to be presented on port 8080 at address 10.1.2.143, 10.1.2.145, and 10.1.2.146 in the hopes that the suspected device will look at those addresses next.

In some implementations, the same honeypot network service may be presented on a number of previously unassigned network addresses. For example, a honeypot network service may be presented at address 10.1.1.44:23, 10.1.2.45:23, 10.1.1.86:23, and 10.1.1.199:23. There may be any number of addresses and ports that are forwarded to the honeypot network service. There may a large number of addresses and ports that are forwarded to the honeypot network service, to seem to fill the network with a large number of potential targets. If these addresses were previously unassigned, there may be no impact on the other devices on the network, particularly if the honeypot network service is only made available to suspected devices. Making the honeypot network service available on multiple addresses may help a compromised device to find the honeypot network service faster, and thus convict the device faster.

Once presented, a honeypot network service may be presented for a predetermined period of time, (e.g., 5 minutes, 15 minutes, 30 minutes, 1 hour, 2 hours, 5 hours, 10 hours, 24 hours, 48 hours, 1 week, 2 weeks). Presenting honeypot network services is relatively inexpensive, and unlikely to disturb normal operation of the network if presented only to suspected network devices (e.g., devices that trigger the presentation of honeypot network services). It is possible that an attacker may conduct network service discovery, and then return after evaluating results of network service discovery to plan an attack. In some implementations, the time period for presenting the honeypot network service is determined based on the network service discovery detection. Activity more likely to be indicative of network service discovery results in a longer time for honeypot presentation. For example, in some implementations, a higher detection score results in a longer presentation time. In block 304, the method may include monitoring communication between one or more devices on the network and the honeypot network service. In some implementations, a network monitor may monitor network traffic between a network device and the honeypot network service. In some implementations, a honeypot network service may be instrumented to provide information about interaction with the honeypot network service. For example, a monitor implemented as part of the honeypot network service may monitor interaction with the honeypot network service. In some implementations, a honeypot network service may be configured to forward all communication from a device to a network monitor. In some implementations, a honeypot network service may be configured to communicate a convict decision to a network monitor or threat management facility.

In some implementations, network communication with the honeypot network service extends the time period that the honeypot network service is presented to a network device. If a network device engages in communication with the honeypot network service, the presentation of the honeypot network service may be extended for a period of time (e.g., 1 week, 2 weeks, 1 month) or indefinitely until cleared by an administrator.

In block 305, the method may include determining that a device is compromised based on the communication with the honeypot network service. In some implementations, the honeypot network service includes functionality to determine whether interaction with the honeypot network service may be indicative of compromise. For example, if a device attempts to authenticate to the honeypot network service or if a device attempts to exploit the honeypot network service, a determination of compromise of the initiating device may be made.

For example, a network monitor may determine whether a device determined to have activity indicative of network service discovery attempts to interact with the honeypot network service. The type of interaction may be indicative of compromise. Given that the honeypot network service is not used for regular business purposes, it is unlikely that any device would have business need to interact with the honeypot network service, and so it may be that any interaction after discovery by a network device of the honeypot network service may be indicative of compromise. In some cases, it may be that certain interaction on certain ports may be tolerated before compromise is determined. In some implementations, if data is sought or downloaded, that would be indicative of compromise, and so would be sufficient to convict. In some implementations, if an apparent exploit is initiated, it would be indicative of compromise.

In some implementations, any interaction with the honeypot network service may be sufficient for conviction. In some implementations, conviction is ordered by the severity of interaction, and a threshold level of severity must be met in order to convict. For example, interaction in order of least to greatest severity may be:

1. A connection attempt (successful or unsuccessful) to a single port (possible "banner grabbing").

2. A request to one or more other ports of the network address on which the honeypot network service is presented (e.g., port scan or service enumeration by an attacker). Depending on configuration, this may be detected by a network monitor rather than the network device providing the honeypot network service. This may also result in other honeypot network services being made available.

3. Interaction with a honeypot service on the service protocol level (e.g., ftp login as anonymous, ldap connect).

4. Authentication attempt (e.g., ldap bind, ftp name command).

5. Information gathering (e.g., directory listing commands, directory traversal commands).

6. Data retrieval (e.g., file retrieval commands).

In some implementations, interaction at a lower level of severity may be tolerated by a honeypot network service, and only interaction at a higher level (e.g., interaction with a honeypot service or more may be sufficient to convict.

In some implementations, device communication with the honeypot is scored, and a score that meets the threshold is determined to be indicative of compromise.

In block 306, the method includes protecting the network from compromise. For example, in some implementations, an alert may be communicated with information regarding the determination of compromise. For example, a message may be sent to a threat protection facility with information about the compromised device and/or including additional information about the network activity and/or monitored communication. The threat protection facility may take additional steps to protect the network.

In some implementations, a device determined to be compromised may be isolated from the network. For example, in some implementations, networking servers and/or equipment may be configured to block network communication from the device. For example, network switches may be notified not to communicate traffic from the compromised device. For example, wifi access points may be configured to block a connection or to block traffic to and from the network device. For example, the physical layer network address (e.g., MAC address) may be blocked from wireless access to the network. In some implementations, a device may have multiple physical network addresses based on having different interfaces (e.g., wired network interface, wireless network interface). In some implementations, when a network device is convicted, all of the network addresses for the device are placed on a "black list" so that the network device cannot connect to the network using a wired network or a wireless network. In some implementations, if the network device is recognized as belonging to the network, communication from all of the network interfaces of the network device may be allowed but restricted to communication with the threat management facility, so that the compromise may be addressed.

In some implementations, when a network device is convicted, users of the convicted network device are blocked from access to the network, or to certain resources. For example, users of the network device in a time period (e.g., users within the past week, past month, past 3 months) may be blocked from access until authentication credentials are reset, in case that user's credentials have been compromised.

In some implementations, an agent running on or with access to the device determined to be compromised may be directed to protect the network. For example, an agent on a device determined to be compromised may be directed to prevent network communications to and from the network device. For example, an agent on a device determined to be compromised may be directed to disable network communications on the network device. In some implementations, the all communications may be disabled except for communication with a threat management facility. An agent on a device determined to be compromised may be directed to conduct a scan or take other measures to identify the source of compromise.

In some implementations, an agent on a device determined to be compromised may be directed to identify the process or processes and/or the application that initiated communication with the honeypot network service. For example, while the honeypot network service is operating, an agent operating on the device determined to be compromised may be directed to monitor network traffic to and from the honeypot network service. The agent may then identify the process or application that is communicating with the honeypot network service. Once the process or application is identified, steps to address the compromise may be taken automatically (e.g., by pausing or otherwise stopping the process, uninstalling or otherwise isolating the application, notifying the user or administrator, canceling or blocking resources available to the process and/or application). A user or administrator may be notified to take manual steps.

Figure 4:
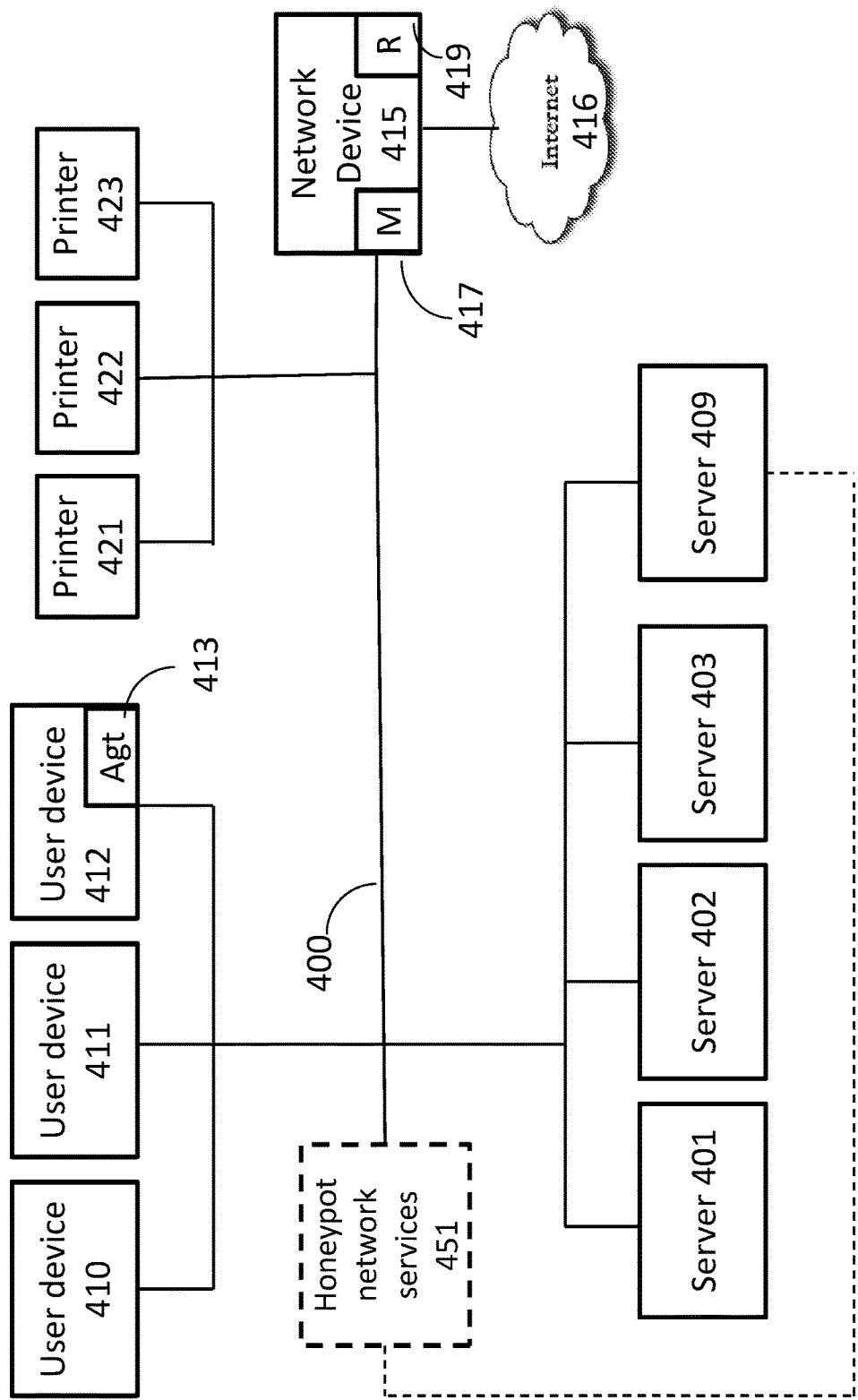
FIG. 4 illustrates an implementation in an exemplary network.

Referring to FIG. 4, an exemplary computer network 400 includes one or more user devices 410, 411, and 412. Each user device 410, 411, 412 may be a device that uses the network for typical user activities, such as a desktop computer, laptop computer, mobile device, table, PDA, cellphone, tablet or another device. It should be understood that the number of user devices 410, 411, 412 shown is exemplary, and there may be any number of user devices 410, 411, 412, or no user devices 410, 411, 412. Each user device 410, 411, 412 may be a client device 144 of FIG. 1 or another device.

One of the user devices 412 includes an agent 413. One or more of the user devices 410, 411, 412 may include an agent, such as agent 413. The agent 413 may be any suitable agent that may be used as described here, for example to protect a device or a computer network. The agent 413 may be part of an operating system or an additional component installed on the user device 412. The agent 413 may be part of a security system installed on the user device 412. The agent 413 may receive instructions from another device on the network 400, such as a threat management facility.

Devices on the network 400, such as user devices 410, 411, 412, may communicate with a network device 415 over the network. Network device 415 is shown as a gateway to the Internet 416, however it is not necessary for the network device 415 to be a gateway to the internet or to other networks. The network device 415 may be a server 142, firewall 138, or appliance 140 as in FIG. 1, a unified threat management device, a web and/or email gateway, an access point (e.g., a wireless access point), a switch, a router, a passive network device, or even a user device 410, 411, 412 or a server 401, 402, 403, 409, or some portion or combination.

The network device 415 may include or include, may be part of, and/or may be in communication with a threat management facility 100 (FIG. 1). In some implementations, the network device 415 is implemented as a server-class computer with unified threat management capability.

A network device 415 includes a network monitor (M) 417. The network monitor 417 monitors network communication, and is able to monitor network requests made by devices on the network to other devices on the network 400. The network device 415 also may monitor communication between devices on the network 400 and devices located outside the network via the Internet 416. The network monitor 417 may be a component of the network device 415 that has physical access to the network 400. The network monitor 417 uses a network interface that is configured to present all network traffic to the network monitor 417. In some implementations, the network monitor is implemented as a stand-alone appliance or server. In some implementations, the network monitor is in communication with other network devices to monitor traffic throughout the network. In some implementations, the network monitor is in communication with agents, such as agent 413, on user devices 410, 411, 412, and receives information about network requests from the agents (e.g., agent 413).

In some implementations, a network monitor detects network service discovery by monitoring requests from devices on the network. As described herein, the network monitor may use one or more of a variety of techniques to detect network activity indicative of network service discovery.

In an example implementation, network service discovery is detected when a device makes a request to two unassigned web address/ports within a predetermined time interval, in this case, 1 second.

The network includes one or more servers 401, 402, 403, 409. The servers 401, 402, 403, 409 may be any type of servers, such as application servers, web servers, email servers, etc. It should be understood that the number of servers 401, 402, 403, 409 shown is exemplary, and there may be any number of servers 401, 402, 403, 409, or no servers 401, 402, 403, 409, Servers 401, 402, 403, 409 may be used to provide services to clients on the network 400.

As shown, server 409 provides honeypot network services. In this implementation, server 409 provides a web server that is used as a honeypot network service. In this example, server 409 does not provide honeypot network services until it is directed to do so by the network monitor 417.

In this example, user device 410 is determined to initiate network communication indicative of network service discovery. In this example, user device 410 makes two requests to unassigned network addresses within a period of 1 second. The network monitor 417 detects this communication from user device 410 and determines that the behavior is indicative of network service discovery. The network monitor 417 then directs a router 419 and server 509 to present a honeypot network service from server 409 to user device 410.

In this implementation, router 419 is included in network device 415. It should be understood that the router 419 may be a separate network device, or incorporated into another network device.

In this example, the network monitor 417 directs the router 419 to use network address translation (NAT) to forward requests made to one or more addresses that are unassigned and that are the target of requests by the suspected network device 410 or are near the addresses were the target of requests by the suspected network device 410. In this way, the honeypot network services that were not previously accessible to the first device prior to the presenting are now available at addresses that the suspected network device 410 is likely to access. It may be that the server 409 is not aware of what addresses the services are presented. The server 409 monitors activity on the honeypot network services, and notifies a threat management facility if communication is indicative of compromise.

In some implementations, the server 409 itself may be able to provide honeypot network services 451 as a "virtual" honeypot 451, at one or more network addresses in addition to or instead of the address of server 409 without needing network address translation provided by network device 415. For example, the server 409 may have multiple network interfaces (physical or virtual) that allow it to present honeypot network services at previously unassigned network addresses. The server 409 may include a router or be in communication with a router for the network 400. In this way the server 409 can be targeted to the network or portion of the network that the compromised user device 410 apparently is investigating without requiring cooperation of another network device such as router 419. The server 409 may receive a request from the network monitor 417 to present a honeypot network service at one or more unassigned addresses, and the server 409 responds by presenting honeypot network services as appropriate and possible.

In some implementations, the network monitor 417 communicates to the server 409 the address of a suspected network device and the address/port of the suspected requests made by the suspected network device. Based on information communicated by the network monitor 417, the server 409 determines what addresses to present the honeypot network services to the suspected device by configuring its network interfaces, network address translation, or both.

In some implementations, the network device 415 may be used to forward traffic from a previously unassigned network address to the server 409. In this way the server 409 does not need to do anything, and the network device 415 controls the presentation of honeypot network services 451. In some implementations, the server 409 that provides honeypot network services is on another network that is accessible by the network device 415. The network device 415 then forwards traffic directed to an unassigned network address to a network device.

In some implementations, when network activity indicative of network service discovery is determined, each subsequent request by the potentially compromised device to an unassigned network address is forwarded by the network device 415 to a honeypot network service 451. In this way, the network device 415 and the honeypot network service may determine quickly whether the requests to unassigned addresses are due to a compromised device.

In some implementations, the network device 415 may be a wireless access point (e.g., a WiFi access point, cellular access point, etc.). Network requests directed to other network devices connected wirelessly to the wireless access point may be indicative of network discovery. For example, network requests made to ports of other network devices connected wirelessly may be indicative of network discovery. In some cases, network devices connected to a wireless access point typically request services from wired network resources or network resources accessible over the internet. In some implementations, honeypot network services may be configured to present as another wireless device. In some implementations, upon conviction, the WiFi access point may block the convicted network device from connecting to the wireless network, for example by blocking wireless network connections. In some implementations, upon conviction, the WiFi access point may allow connection from the convicted network device but block all or a subset of network communication with the convicted network device. For example, the WiFi access point may allow connection to the internet, but block communication with local network devices. For example, the WiFi access may allow communication only with a threat management system so that the threat management system can remediate a compromise.

Referring to FIG. 5, an exemplary list of network addresses for the network of FIG. 4 shows in row 501 that the network address of server 401 is 10.1.1.1. In row 502, the network address of server 402 is shown as 10.1.1.2, and in row 503 the network address of server 403 is shown as 10.1.1.3. The servers 401, 402, and 403 are each presenting services on ports 23, 48, 80, and 8080.

In row 509, the network address of web server 409 is 10.1.1.9. The web server 409 is offering services on ports 80 and 8080.

In row 520, the network address of user device 410 is 10.1.1.20. In row 521, the network address of user device 411 is 10.1.1.21. In row 522, the network address of user device 412 is 10.1.1.22.

In row 531, the network address of printer 421 is 10.1.1.31. In row 532, the network address of printer 422 is 10.1.1.32. In row 533, the network address of printer 423 is 10.1.1.33.

The remaining network addresses shown are unassigned.

Referring to FIG. 6, a log of network requests demonstrates an example using the network of FIG. 4 and the example network addresses of FIG. 5.

At entry 601, a request from 10.1.1.20:10300 (the format network address:port means network address 10.1.1.20 and port 10300) to 10.1.1.2:80 is observed, which is a HTTP request from user device 410 to server 402. This does not appear to be suspicious activity.

At entry 602, a request from 10.1.1.21:13200 to 10.1.1.3:80 is observed, which is HTTP request from user device 411 to server 403. This does not appear to be suspicious activity.

At entry 603, a request from 10.1.1.20:10301 to 10.1.1.2:80 is observed, which is a HTTP request from user device 410 to server 402. This does not appear to be suspicious activity.

At entry 604, a request from 10.1.1.21:13201 to 10.1.1.23:23 is observed, which is a request from user device 411 to an unassigned address. This is one request to an unassigned address.

At entry 605, a request from 10.1.1.21:13201 to 10.1.1.23:28 is observed, which is a second request from user device 411 to an unassigned address. In this example, the network monitor determines that device 10.1.1.21 is suspicious. The network monitor directs honeypot network services to be presented, and honeypot network services are presented on 10.1.1.23. Communication with the honeypot network services at 10.1.1.23 are observed.

At entry 606, a request from 10.1.1.20:10300 to 10.1.1.2:80 is observed, which is a HTTP request from user device 410 to server 402. This does not appear to be suspicious activity.

At entry 607, a request from 10.1.1.21:13201 to 10.1.1.23:80 is observed, which is a HTTP request from user device 411 to the honeypot network service. The suspected compromised server presumably now knows that the honeypot network service is available.

At entry 608, a second request from 10.1.1.21:130201 to 10.1.1.23:80 is observed, in which user device 411 attempts to explore the information available at the server. The request may be, for example, an HTTP request for information on the honeypot network service presented at port 80.

Based on this activity, the user device at 10.1.1.21 is convicted, meaning that it is determined to be compromised. Steps are then taken to address the compromise, and protection of the network initiated.

Figure 7:
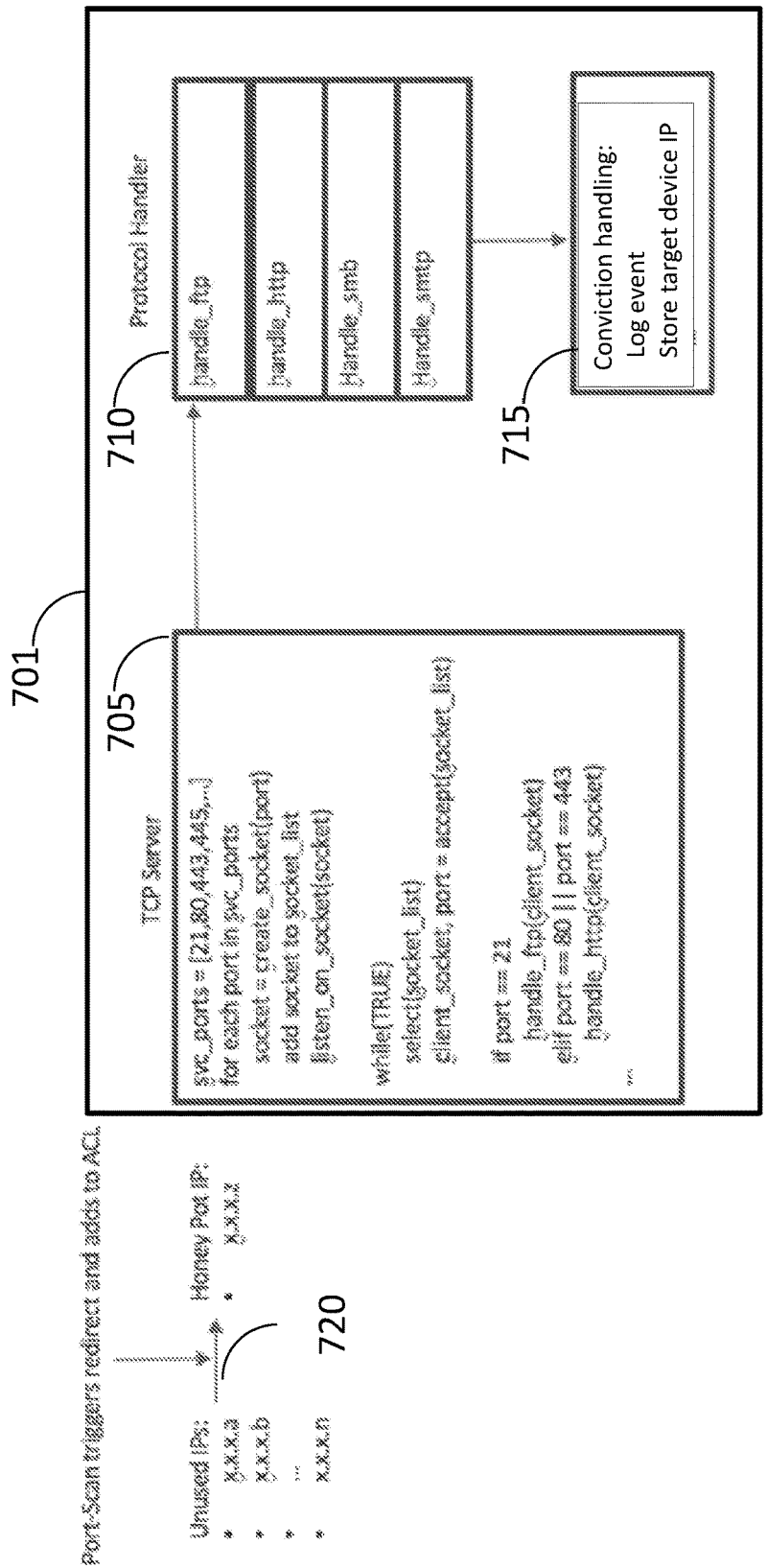
FIG. 7 illustrates an implementation of a system for providing honeypot network services.

Referring to FIG. 7, in some implementations, a simulated honeypot network service 701 includes a TCP server 705, a protocol handler 710, and a conviction handler 715. Each of the TCP server 705, protocol handler 710, and conviction handler 715 are implemented as software modules on a network protection appliance. The appliance may use the architecture as described with respect to FIG. 2.

The TCP server 705 includes a list of service ports, shown as service ports 21, 80, 443, 445, and others. It should be understood that these ports are for one implementation, and other ports may be used. For each of the ports, a socket is created and added to a socket list. The TCP server 705 then listens on the port associated with each socket, and direct requests to one of the protocol handlers 710. In this example, requests to port 21 are directed to a ftp handler, and requests to port 80 and 443 are directed to a http handler. Protocol handlers 710 are configured for each honeypot network service. As shown, there are protocol handlers 710 for ftp, http, smb, and smtp. Again, it should be understood that these protocols for this implementation, and other handlers may be used. The protocol handlers may be worker threads or child processes that implement the protocol stubs.

In this implementation, some well-known privileged ports for HTTP/HTTPS (TCP: 80, 8080, 443), SMB (UDP: 137-137, TCP: 445), FTP (TCP: 21), SMTP (TCP: 25, 587, 465), and IMAP (TCP: 143, 993) are implemented. In some implementations, only basic protocol implementations may be needed. For example, for FTP and SMB protocols, the file listing commands may be implemented, and if a target device accesses the service and requests a file list, that may be sufficient to convict. For HTTP and HTTPS protocols, access or return of a directory listing and a get request on one of the files may be sufficient to convict. For SMTP and IMAP protocols, protocol level access may be sufficient to convict. For example, a banner can be served, and access sufficient to convict.

In some implementations, files with specific content may be provided. The specific content may be detected, for example, by an intrusion detection system or data loss prevention system. This may be helpful in understanding attack patterns and techniques used by an intruder to transfer files from the network.

In some implementations, honeypot network services 705 are running on a network device and waiting for incoming connections. A router (e.g., firewall, gateway, network device 415, or other device) has a rule in place that initially doesn't forward any connection attempts to the honeypot network services, so that they are hidden from the network. The router may have a rule in place so that only suspicious hosts are directed to the honeypot network services. For example, with netfilter, the rule might be: "suspicious_hosts->honey_pot_IP: ALLOW."

Port scan detection by a network monitor may result in an assignment of a network device to the "suspicious hosts" set. For example, port-scan detection may be a condition for another router rule to add a network address to the "suspicious_hosts" IPSET. Once the suspicious network device is added to the "suspicious_hosts" IPSET, the suspicious network device will have access to the honeypot network services.

With iptables, IPSET entries have a configurable time-to-live (TTL). By setting the time-to-live, access to the honeypot network services may be configured when the network device is added to the IPSET. In this example, the time-to-live is set to 36 hours.

An additional address or addresses may then be forwarded to the address of the honeypot network services, again only for members of the suspicious_hosts list. In this way, the honeypot network service may be quickly provisioned for a given suspicious network device.

In an aspect, a computer program product comprising non-transitory computer executable code embodied in a non-transitory computer readable medium that, when executing on one or more computing devices, performs any or all of the steps discussed above.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A non-transitory computer-readable medium comprising instructions executable by a processor for detecting a compromised device on a network, the instructions when executed causing the processor to perform steps, comprising:
   at a threat management facility, monitor network activity within an enterprise network;
   detect network activity indicative of network service discovery by a first device within the enterprise network, the network activity comprising requests to the same port at different addresses accessible through the enterprise network;
   detect traffic from the first device to an unassigned network address within the enterprise network;

in response to detecting the network activity comprising requests made to the same port at different addresses and detecting traffic directed from the first device to the port at an unassigned network address within the enterprise network, present a honeypot network service with a known security flaw specific to the service typically provided at the port to the first device within the enterprise network by redirecting the traffic directed to the port at the unassigned network address to the honeypot network service for a limited period of time;

monitor communication between the first device and the honeypot network service to determine whether the monitored communication is indicative of compromise of the first device;

determine that the first device is compromised based on the monitored communication between the first device and the honeypot network service; and based on a determination that the first device is compromised, initiate measures to remediate the first device.

2. The non-transitory computer-readable medium of claim 1, wherein the measures initiated comprise isolating communication from the first device from the network.

3. The non-transitory computer-readable medium of claim 1, wherein the measures initiated comprise notifying a threat detection facility.

4. The non-transitory computer-readable medium of claim 1, wherein the measures initiated comprise generating an alert about the compromised first device.

5. A method for detecting a compromised device on a network, the method comprising:

at a threat management facility, monitor network activity within an enterprise network;

detecting network activity indicative of network service discovery by a first device within the enterprise network separate from the threat management facility, the network activity comprising requests to the same port at different addresses accessible to the first device through the enterprise network;

detecting traffic from the first device to an unassigned network address within the enterprise network;

in response to detecting the network activity comprising requests made to the same port at different addresses and detecting traffic directed from the first device to the port at an unassigned network address within the enterprise network, presenting a honeypot network service with a known security flaw specific to the service typically provided at the port to the first device within the enterprise network by redirecting the traffic directed to the port at the unassigned network address to the honeypot network service for a limited period of time;

monitoring communication between the first device and the honeypot network service to determine whether the monitored communication is indicative of compromise of the first device;

determining that the first device is compromised based on the monitored communication between the first device and the honeypot network service; and based on a determination that the first device is compromised, initiate measures to remediate the first device.

6. The method of claim 5, wherein the honeypot network service is not accessible to the first device prior to the presenting.

7. The method of claim 5, wherein the honeypot network service is presented by making the honeypot network service available at a previously unassigned network address.

8. The method of claim 5, wherein the honeypot network service is presented by forwarding traffic directed to the unassigned network address to a second network device, the second network device different from the first network device.

9. A system for detecting a compromised device, the system comprising:

a processor;

a memory comprising instructions executable by the processor, the instructions when executed causing the processor to perform steps, comprising:

at a threat management facility, monitor network activity within an enterprise network;

detect network activity indicative of network service discovery by a first device within the enterprise network separate from the threat management facility, the network activity comprising requests to the same port at different addresses accessible to the first device through the enterprise network;

detect traffic from the first device to an unassigned network address within the enterprise network;

in response to detecting the network activity comprising requests made to the same port at different addresses and detecting traffic directed from the first device to the port at an unassigned network address within the enterprise network, presenting a honeypot network service with a known security flaw specific to the service typically provided at the port to the first device by redirecting the traffic directed to the port at the unassigned network address to the honeypot network service for a limited period of time;

monitor communication between the first device and the honeypot network service to determine whether the monitored communication is indicative of compromise of the first device;

determine that the first device is compromised based on the monitored communication between the first device and the honeypot network service; and based on a determination that the first device is compromised, initiate measures to remediate the first device.

10. The system of claim 9, wherein the instructions cause the processor to initiate measures to remediate the first device by causing the processor to prevent communication from the first device to the enterprise network.

11. The system of claim 9, wherein the instructions cause the processor to initiate measures to remediate the first device by notifying a threat detection facility that the first device is compromised.

12. The system of claim 9, wherein the instructions cause the processor to initiate measures to remediate the first device by identifying a process on the first device that generated the detected network activity.

13. The system of claim 12, wherein the instructions cause the processor to initiate measures to remediate the first device by terminating the process on the first device that generated the detected network activity.

14. The system of claim 12, wherein the instructions cause the processor to initiate measures to remediate the first device by isolating the process on the first device that generated the detected network activity.

* * * * *